United States Patent
Metsugi

(10) Patent No.: US 8,432,971 B2
(45) Date of Patent: Apr. 30, 2013

(54) IMAGE PROCESSING APPARATUS, IMAGE PROCESSING METHOD AND IMAGE PROCESSING PROGRAM

(75) Inventor: Katsuhiko Metsugi, Kanagawa (JP)

(73) Assignee: Sony Corporation, Tokyo (JP)

( * ) Notice: Subject to any disclaimer, the term of this patent is extended or adjusted under 35 U.S.C. 154(b) by 628 days.

(21) Appl. No.: 12/431,869

(22) Filed: Apr. 29, 2009

(65) Prior Publication Data

US 2009/0274215 A1 Nov. 5, 2009

(30) Foreign Application Priority Data

Apr. 30, 2008 (JP) ................................ P2008-119200

(51) Int. Cl.
*H04N 7/12* (2006.01)
(52) U.S. Cl.
USPC .................................................... 375/240.16

(58) Field of Classification Search ............. 375/240.16; H04N 7/12
See application file for complete search history.

(56) References Cited

U.S. PATENT DOCUMENTS

2006/0193388 A1* 8/2006 Woods et al. ............. 375/240.16
2007/0160138 A1* 7/2007 Wedi et al. ............... 375/240.03

FOREIGN PATENT DOCUMENTS

| JP | 4-167882 | 6/1992 |
| JP | 2005-86825 | 3/2005 |
| JP | 2005 86830 | 3/2005 |
| JP | 2006-174486 | 6/2006 |

* cited by examiner

*Primary Examiner* — David Czekaj
*Assistant Examiner* — Tracy Li
(74) *Attorney, Agent, or Firm* — Frommer Lawrence & Haug LLP; William S. Frommer

(57) ABSTRACT

An image processing apparatus includes an inverse quantization section; an inverse orthogonal transform section; a motion-vector prediction section; a motion compensation section; a deblocking processing section; and a memory.

17 Claims, 13 Drawing Sheets

| A | B | C | D | E |
|---|---|---|---|---|
| F | G | H | I | J |
| K | L | M | N | O |
| P | Q | R | S | T |

(0,16)

(0,32)

(0,48)

(0,64)

LAYOUT OF MACROBLOCKS ON A FRAME
WITH DIMENSIONS OF 80 PIXELS × 64 PIXELS

| A | B | C | D | E |
|---|---|---|---|---|
| F | G | H | I | J |
| K | L | M | N | O |
| P | Q | R | S | T |

(0,16)

(0,32)

(0,48)

(0,64)

MBs REFERENCED IN A DEBLOCKING PROCESS
CARRIED OUT ON AN MB M

PROCESSING TO DETERMINE WHETHER OR NOT IT IS NECESSARY TO CARRY OUT A DEBLOCKING PROCESS ON THE BASIS OF MOTION VECTORS

LAYOUT OF MOTION-VECTOR DATA IN A MEMORY

HYBRID MOTION-VECTOR PREDICTION PROCESS

EMBEDDING THE RESULT OF HYBRID MV PREDICTION INTO MV

IMAGE PROCESSING APPARATUS, IMAGE PROCESSING METHOD AND IMAGE PROCESSING PROGRAM

BACKGROUND OF THE INVENTION

1. Field of the Invention

The present invention relates to an image processing apparatus, an image processing method adopted by the image processing apparatus and an image processing program implementing the image processing method.

2. Description of the Related Art

In recent years, image information is treated by converting the image information into digital data and an image processing apparatus has been becoming popular as an apparatus which utilizes redundancy peculiar to the image information for the purpose of transmitting and storing the information with a high degree of efficiency.

In particular, an image processing apparatus has been becoming popular as an apparatus which conforms to a method such as the MPEG (Moving Picture Expert Group) method for compressing image information by carrying out a motion compensation process and an orthogonal transform process such as a DCT (Discrete Cosine Transform) process.

As typical codec specifications of this type, VC-1 specifications are known. In accordance with the VC-1 specifications, an integer transform process is adopted as a substitute for the DCT process with the floating point precision. In addition, in accordance with the VC-1 specifications, the so-called fraction precision pixel motion compensation is carried out as a compensation process in which, for each picture, the pixel precision of the motion vector can be set at a selectable value of ½ or ¼. By the way, in accordance with a method known as MPEG-4 Part 2, the pixel precision can be selected only for each stream. In this patent specification, the technical term 'motion vector' is abbreviated to MV in some cases.

In accordance with the MPEG4 method, the so-called median prediction process is carried out in order to allow the motion vector to be expressed by an even smaller code quantity. In the median prediction process, an intermediate value of adjacent motion vectors is taken as a predicted vector and, then, an error between the actual motion vector and the predicted vector is coded. The adjacent motion vectors are motion vectors for macroblocks (MBs) located at adjacent positions on the upper, upper right and left sides. In this patent specification, a macroblock is also referred to merely as a block and abbreviated to an MB in some cases.

If motion vectors having magnitudes and directions locally much different from each other appear in the median prediction process, the prediction process adversely results in a larger code quantity in some cases.

In accordance with the VC-1 specifications, the median prediction process is not carried out. Instead, a hybrid motion-vector prediction process is carried out. In the hybrid motion-vector prediction process, each of the adjacent motion vectors for macroblocks (MBs) located at adjacent positions on the upper and left sides is taken as a predicted value as it is and a macroblock MB to be used can be specified.

Then, in accordance with the VC-1 specifications, an IQ (Inverse Quantization) process and an IDCT (Inverse Discrete Cosine Transform) process carried out on macroblocks (MBs) in 1 slice (or 1 picture) are completed. Subsequently, after all macroblocks (MBs) in the same slice have been decoded, a deblocking process for reducing noises is carried out.

The deblocking process conforming to the VC-1 specifications is carried out by making use of a loop filter. In such a deblocking process, the loop filter computes an average of two pixel values on a block boundary as shown in a diagram of FIG. 1.

In the deblocking process, processing for a frame is carried out. In the case of an I, B or BI frame, the block size is set at a fixed value of 8×8 and all block boundaries are subjected to the deblocking process. In the case of a P frame, on the other hand, the block size has a variety of values such as 8×8, 8×4, 4×8 and 4×4 as shown in a diagram of FIG. 2 and the conditions for execution of the deblocking process are described as follows:

1: The block boundary shall be a boundary between blocks having non-zero intra coefficients.
2: The block shall have a difference in motion vector between adjacent blocks.

FIG. 3 is an explanatory diagram showing a model of a process to compute a difference in motion vector between blocks on a P frame. The motion-vector difference computation process is carried out to find a difference in motion-vector data between a current macroblock MBCUR and two macroblocks adjacent to the current macroblock MBCUR. To put it concretely, the two macroblocks adjacent to the current macroblock MBCUR are a macroblock MBABV at an adjacent location above the current macroblock MBCUR and a macroblock MBLF at an adjacent location on the left-hand side of the current macroblock MBCUR.

In the model diagram of FIG. 3, reference notation cur_mv is the motion-vector data of the current macroblock MBCUR, reference notation above_mv is the motion-vector data of the adjacent macroblock MBABV and reference notation left_mv is the motion-vector data of the adjacent macroblock MBLF.

During the motion-vector difference computation process, an access to a memory is made in an operation to acquire each piece of motion-vector data from the memory.

Japanese Patent Laid-open No. 2005-86830 proposes a technology for executing control in a bit stream as one of technologies of deblocking filters conforming to the VC-1 specifications.

SUMMARY OF THE INVENTION

In the case of a P frame conforming to the VC-1 specifications, the necessity to carry out a deblocking process on each block boundary is determined by adoption of two methods described as follows:

(1): The motion vectors of two adjacent blocks sandwiching a block boundary are compared with each other and, if the result of the comparison indicates that the motion vectors of the two adjacent blocks are different from each other, a deblocking process is carried out on the block boundary.

(2): If the data of the block bordering upon a block boundary is composed of not only data of a referenced image including the block, but also data added from a bit stream, a deblocking process is carried out on the block boundary.

In order to determine the method (1) described above, it is necessary to make accesses to a memory in an operation to load motion-vector data from the memory. Since each motion-vector data has a vertical-direction component and a horizontal-direction component, the vertical-direction and horizontal-direction components of the pieces of motion-vector data of two adjacent upper and left blocks are loaded from the memory in four memory accesses in an operation to compare the pieces of motion-vector data of the current block and the upper block with each other as well as the pieces of motion-vector data of the current block and the left block with each other.

FIG. 4 is a diagram showing a typical data layout of motion vectors adjacent to each other in a memory.

As shown in the diagram of FIG. 4, there are motion vectors of blocks adjacent to each other in the vertical direction. It is quite within the bounds of possibility that the motion vector of an upper block adjacent to the current block is stored at a memory location not adjacent to the memory location at which the motion vector of the current block is stored. Thus, it is also quite within the bounds of possibility that, in an access to the memory location of the motion vector of the upper block adjacent to the current block during an operation to read out the motion vector of the upper block adjacent to the current block from the memory, a cache miss occurs. This is because time has lapsed since a previous access made in an operation to compute a difference in motion vector between the current block and the upper block adjacent to the current block.

It is desirable to provide an image processing apparatus capable of carrying out entire processing at a higher speed by reducing the number of accesses to motion-vector data stored in a memory during a deblocking process and, thus, decreasing the number of cache misses occurring in the accesses, an image processing method to be adopted in the image processing apparatus and an image processing program implementing the image processing method.

An image processing apparatus according to a first embodiment of the present invention employs: an inverse quantization section configured to carry out an inverse quantization process on compressed image information obtained as a result of a quantization process performed after an orthogonal transform process executed in block units; and an inverse orthogonal transform section configured to carry out an inverse orthogonal transform process on coefficient data obtained as a result of the inverse quantization process in order to output decoded image data. The apparatus further employs a motion-vector prediction section configured to carry out a hybrid motion-vector prediction process on the basis of a result of a motion-vector decoding process executed by performing a variable-length decoding process, generate motion-vector data obtained as a result of the hybrid motion-vector prediction process, and embed hybrid prediction information to be used to indicate whether or not it is necessary to carry out a deblocking process into the motion-vector data so as to allow the result of the hybrid motion-vector prediction process to be reutilized at the deblocking process. The apparatus further employs a motion compensation section configured to carry out a motion compensation process for the decoded image data output by the inverse orthogonal transform section by making use of the motion-vector data received from the motion-vector prediction section; a deblocking processing section configured to carry out the deblocking process on the decoded image data completing the motion compensation process in accordance with the hybrid prediction information embedded in the motion-vector data; and a memory used for storing the motion-vector data in a state of being accessible to the deblocking processing section.

It is desirable to provide a configuration in which at least one of the motion-vector prediction section and the deblocking processing section has a function to replace the motion vector of a current macroblock (MB) with the motion vector of a comparison MB compared with the current macroblock in accordance with the hybrid prediction information embedded in the motion-vector data.

It is also desirable to provide another configuration in which at least one of the motion-vector prediction section and the deblocking processing section replaces the motion vector of a current MB with the motion vector of a comparison MB compared with the current macroblock in accordance with the hybrid prediction information embedded in the motion-vector data if the absolute value of a difference in motion vector between the current and comparison MBs is greater than a threshold value.

It is also desirable to provide a further configuration in which the hybrid prediction information is embedded into a bit string representing the motion-vector data so as to occupy the position of a bit not required in processing making use of the motion-vector data.

It is also desirable to provide a still further configuration in which the motion-vector data is created for each of the vertical and horizontal directions of coordinates of a position on the referenced image and the hybrid prediction information is embedded into a bit string representing the motion-vector data so as to occupy the position of a bit not required in processing making use of the motion-vector data.

It is also desirable to provide a still further configuration in which the motion-vector data is data of the fixed-point format.

It is also desirable to provide a still further configuration in which the motion-vector data is data of the fixed-point format including a sign bit part, an integer part and a fraction part, and the hybrid prediction information is embedded into the motion-vector data to occupy the position of the least significant bit of the motion-vector data.

An image processing method according to a second embodiment of the present invention includes an inverse quantization step of carrying out an inverse quantization process on compressed image information obtained as a result of a quantization process performed after an orthogonal transform process executed in block units. The method further includes an inverse orthogonal transform step of carrying out an inverse orthogonal transform process on coefficient data obtained as a result of the inverse quantization process in order to output decoded image data; a motion-vector decoding step of carrying out a variable-length decoding process on received coded data in order to decode a motion vector expressed by the coded data; and a motion-vector generation step of carrying out a hybrid motion-vector prediction process on the basis of a result of the decoding step and generating motion-vector data obtained as a result of the hybrid motion-vector prediction process. The method further includes a motion-vector prediction step of embedding hybrid prediction information to be used to indicate whether or not it is necessary to carry out a deblocking process into the motion-vector data so as to allow the result of the hybrid motion-vector prediction process to be reutilized at the deblocking processing step; and a storage step of storing the motion-vector data into a memory in a state of being accessible at the deblocking process. The method further includes a motion compensation step of carrying out a motion compensation process for the decoded image data output at the inverse orthogonal transform step by making use of the motion-vector data generated; and the deblocking processing step of carrying out the deblocking process on the decoded image data completing the motion compensation process in accordance with the hybrid prediction information embedded in the motion-vector data.

A program provided in accordance with a third embodiment of the present invention to serve as an image processing program to be executed by a computer to carry out image processing including an inverse quantization step of carrying out an inverse quantization process on compressed image information obtained as a result of a quantization process performed after an orthogonal transform process executed in block units. The processing further includes an inverse orthogonal transform step of carrying out an inverse orthogonal transform process on coefficient data obtained as a result of the inverse quantization process in order to output decoded image data; and a motion-vector decoding step of carrying out a variable-length decoding process on received coded data in order to decode a motion vector expressed by the coded data. The processing further includes a motion-vector generation step of carrying out a hybrid motion-vector prediction process on the basis of a result of the decoding step and generating motion-vector data obtained as a result of the hybrid motion-vector prediction process; and a motion-vector prediction step of embedding hybrid prediction information to be used to indicate whether or not it is necessary to carry out a deblocking process into the motion-vector data so as to allow the result of the hybrid motion-vector prediction process to be reutilized at a deblocking processing step. The processing further includes a storage step of storing the motion-vector data into a memory in a state of being accessible at the deblocking process; a motion compensation step of carrying out a motion compensation process for the decoded image data output at the inverse orthogonal transform step by making use of the motion-vector data generated; and the deblocking processing step of carrying out the deblocking process on the decoded image data completing the motion compensation process in accordance with the hybrid prediction information embedded in the motion-vector data.

In accordance with the embodiments of the present invention, the motion-vector prediction section carries out a hybrid motion-vector prediction process and generates motion-vector data obtained as a result of the hybrid motion-vector prediction process. In addition, the motion-vector prediction section embeds hybrid prediction information to be used to indicate whether or not it is necessary to carry out a deblocking process into the motion-vector data obtained as a result of the hybrid motion-vector prediction process so as to allow the result of the hybrid motion-vector prediction process to be reutilized at the deblocking process.

The deblocking processing section carries out the deblocking process on the decoded image data completing the motion compensation process in accordance with the hybrid prediction information embedded in the motion-vector data.

In accordance with the present invention, the number of accesses each made in the deblocking process as an access to the memory to read out motion-vector data from the memory can be decreased and the number of cache misses can therefore be reduced. Thus, the entire processing can be carried out at a high speed.

BRIEF DESCRIPTION OF THE DRAWINGS

These and other features of the present invention will become clear from the following description of the preferred embodiment given with reference to the accompanying diagrams, in which:

FIG. 9 is a diagram showing a frame which has a horizontal-direction size of 80 pixels and a vertical-direction size of 64 pixels and divided into twenty 16-pixel×16-pixel MB (microblocks) denoted by capital letters A to T respectively;

FIG. 10 is a diagram showing the MBs shown in the diagram of FIG. 9 to indicate that MBs are referenced during a process of determining the necessity to carry out the deblocking process on a current MB M;

DETAILED DESCRIPTION OF THE PREFERRED EMBODIMENT

An embodiment of the present invention is explained by referring to diagrams as follows.

Figure 1:
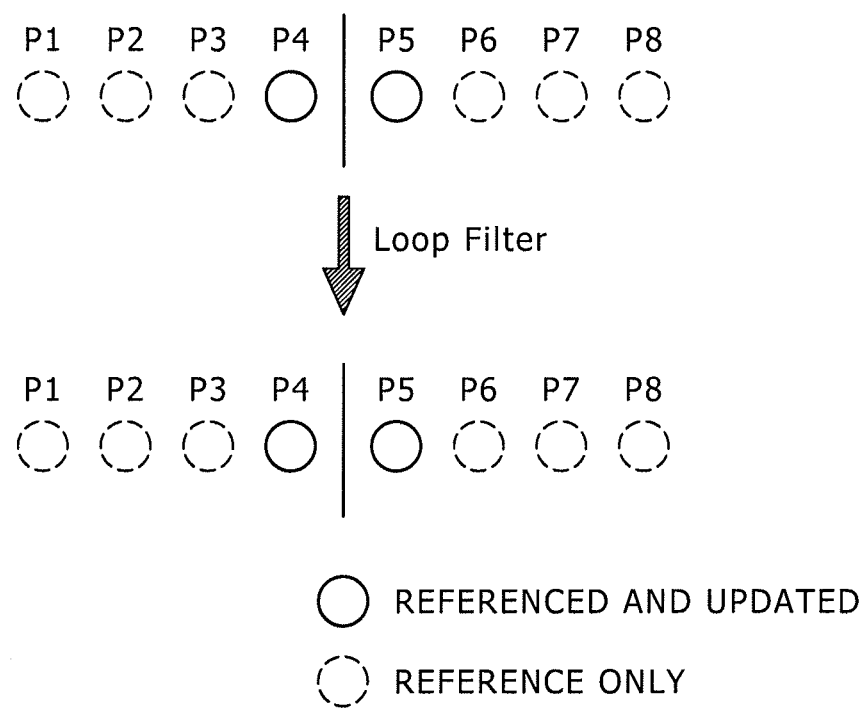
FIG. 1 is an explanatory diagram to be referred to in description of a deblocking process conforming to VC-1 specifications.
Figure 2:
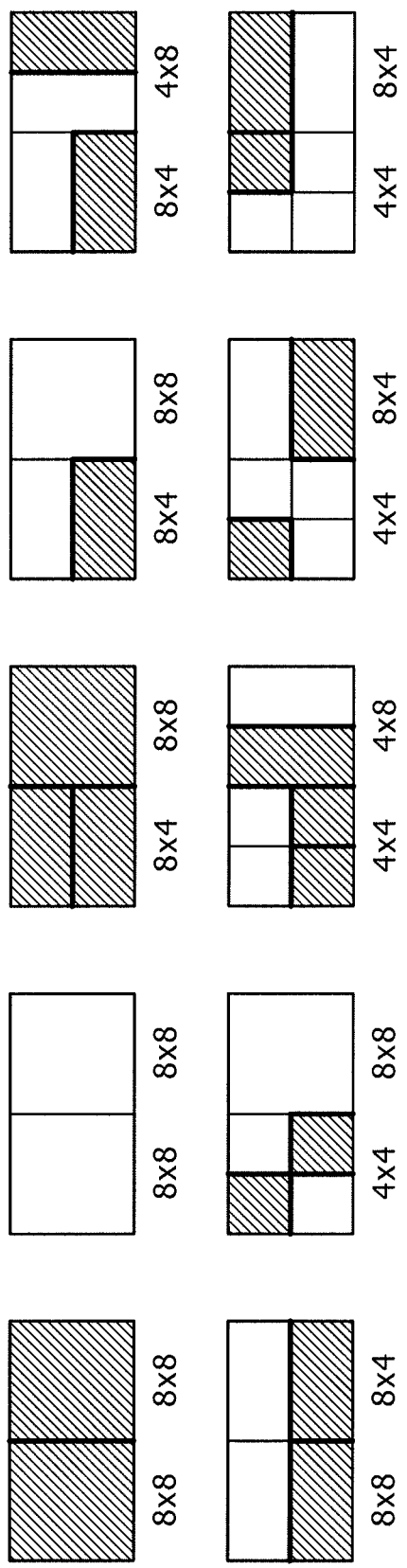
FIG. 2 is a diagram showing a variety of sizes of a block of a frame.
Figure 3:
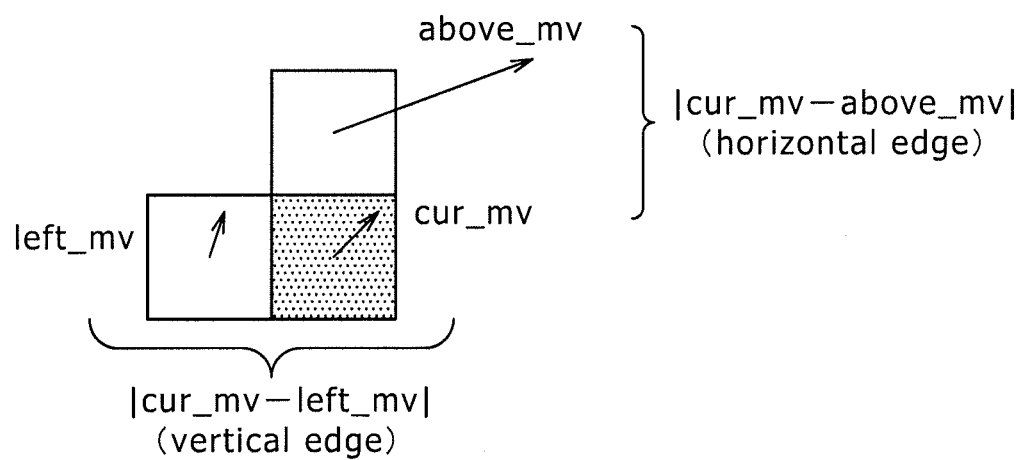
FIG. 3 is an explanatory diagram showing a model of a process to compute a difference in motion vector between blocks.
Figure 4:
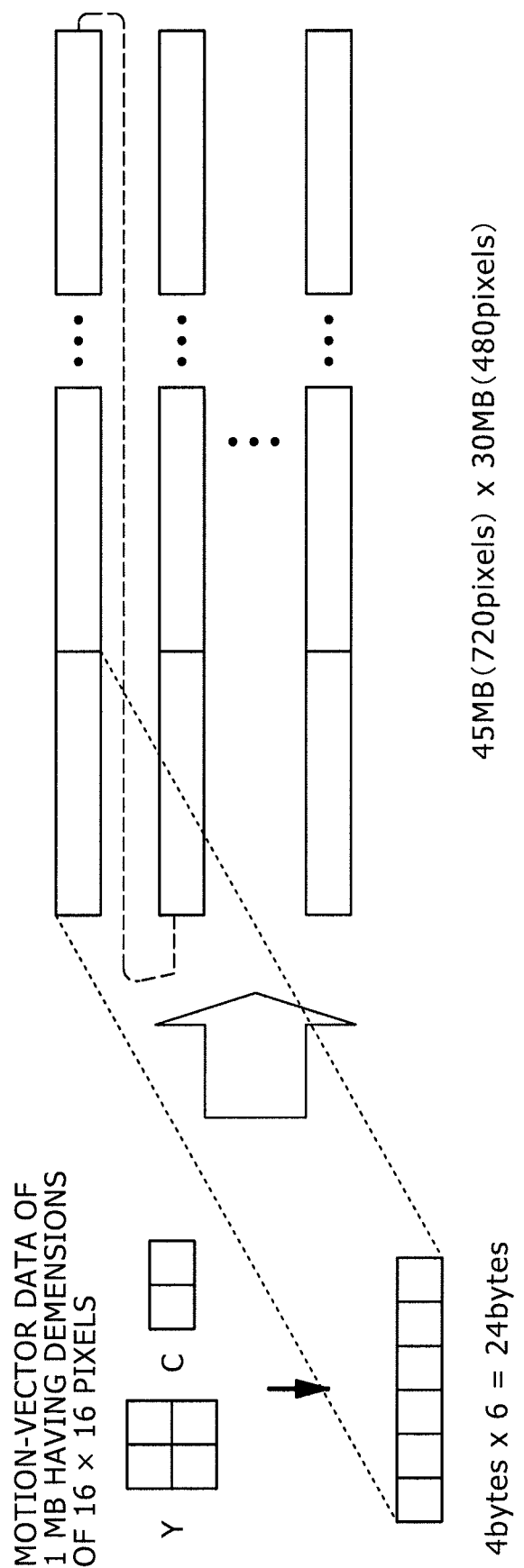
FIG. 4 is a diagram showing a typical data layout of motion vectors adjacent to each other in a memory.
Figure 5:
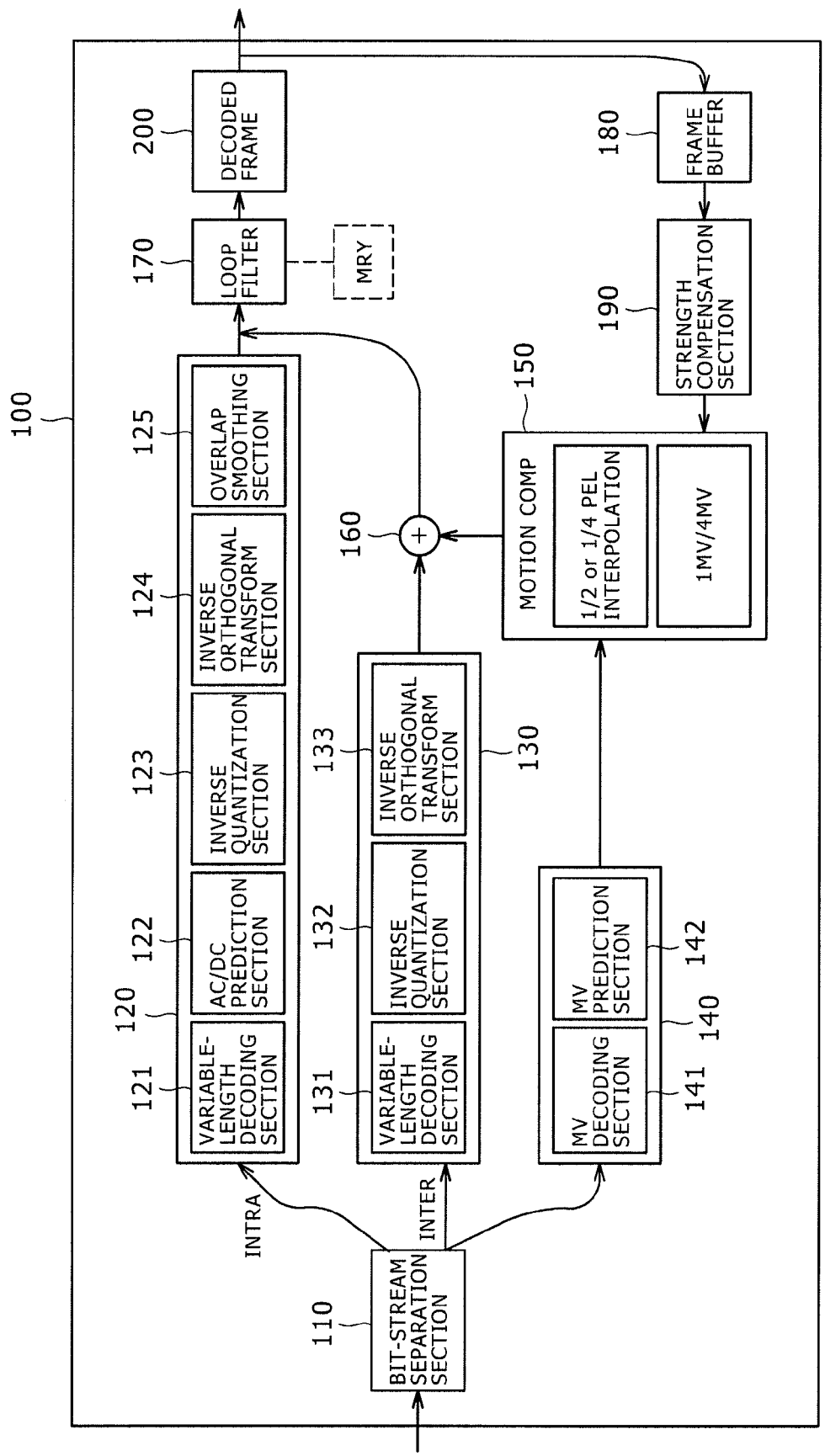
FIG. 5 is a block diagram showing the configuration of an image processing apparatus according to the embodiment of the present invention.

FIG. 5 is a block diagram showing the configuration of an image processing apparatus 100 according to the embodiment of the present invention.

As shown in the block diagram of FIG. 5, the image processing apparatus 100 employs a bit-stream separation section 110, an intra MB (macroblock) processing section 120, an inter MB processing section 130, a motion-vector decoding and prediction section 140, a motion compensation section 150, an adder 160, a loop filter 170 serving as a deblocking processing section, a strength compensation section 190 and a frame buffer 180. In addition, reference numeral 200 shown in the block diagram of FIG. 5 denotes a decoded frame.

The image processing apparatus 100 according to the embodiment allows a result of a hybrid motion-vector prediction process carried out by the motion-vector decoding and prediction section 140 to be reused in determining necessity to carry out a deblocking process in video codec processing that generally makes use of a deblocking filter for reducing noises.

A motion-vector prediction section 142, the motion compensation section 150 and the loop filter 170 are characteristic sections employed in the image processing apparatus 100.

The motion-vector prediction section 142 carries out a hybrid motion-vector prediction process on the basis of a result of a motion-vector decoding process executed by performing a variable-length decoding process. Then, the motion-vector prediction section 142 generates motion-vector data obtained as a result of the hybrid motion-vector prediction process. Subsequently, the motion-vector prediction section 142 embeds hybrid prediction information to be used to indicate whether or not it is necessary to carry out a deblocking process into the motion-vector data so as to allow the motion-vector data obtained as a result of the hybrid motion-vector prediction process to be reutilized when the deblocking process is carried out.

The motion compensation section 150 is a section for carrying out a motion compensation process on decoded image data by making use of the motion-vector data received from the motion-vector prediction section 142.

The deblocking processing section 170 is a section for carrying out a deblocking process on the decoded image data completing the motion compensation process performed by the motion compensation section 150 in accordance with the hybrid prediction information embedded in the motion-vector data by the motion-vector prediction section 142.

Figure 6:
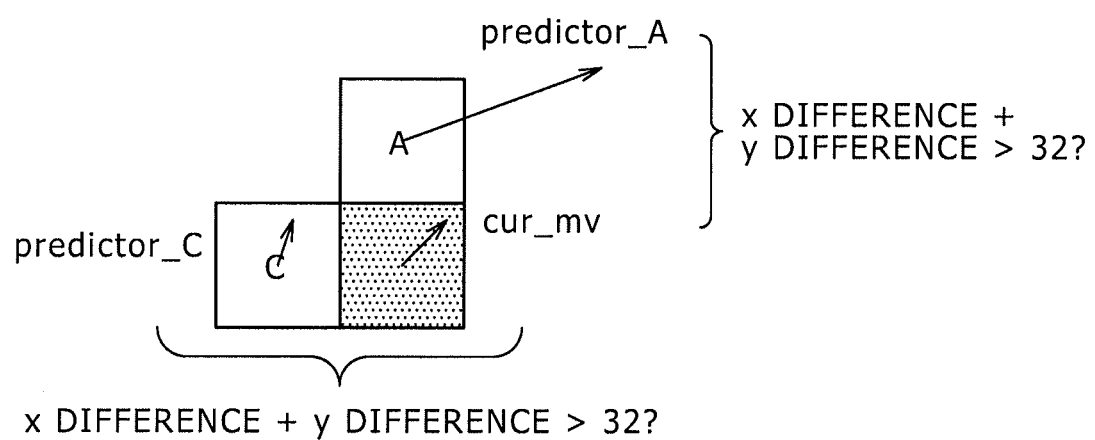
FIG. 6 is an explanatory diagram showing a model of a process to compute differences in motion-vector data between a current block and two blocks adjacent to the current block.

The image processing apparatus 100 according to this embodiment computes a difference in motion-vector data between a current block and a block A adjacent to the current block as well as a difference in motion-vector data between the current block and a block B adjacent to the current block as shown in FIG. 6. In the diagram of FIG. 6, reference notations cur_mv, predictor_A and predictor_C denote the motion-vector data of the current block, the block A and the block C, respectively.

It is possible to provide a configuration in which the image processing apparatus 100 compares the sum of the x and y differences between the motion vector of the current block and the motion vector of an adjacent block with a predetermined threshold value of 32. In this patent specification, the x difference denotes a difference of components of the motion vectors in horizontal direction whereas the y difference denotes a difference of components of the motion vectors in vertical direction. If the result of the comparison indicates that the sum of the x and y differences is greater than 32, the motion vector of the current block is replaced by the motion vector of the adjacent block. With such a configuration, the number of accesses made in the deblocking process as accesses to motion-vector data can be reduced and the number of cache misses can therefore be decreased as well. Thus, the entire processing can be carried out at a high speed.

The following description concretely explains the configuration and function of each section employed in the image processing apparatus 100.

The bit-stream separation section 110 receives an input bit stream, supplying intra MB data to the intra MB processing section 120, inter MB data to the inter MB processing section 130 and data required in a motion detection process to the motion-vector decoding and prediction section 140 in accordance with typically header information included in the bit stream.

The intra MB processing section 120 employs a VLD (Variable-Length Decoding) section 121, an AC/DC prediction section 122, an IQ (Inverse Quantization) section 123, an inverse orthogonal transform section 124 and an overlap smoothing section 125.

The variable-length decoding section 121 is a section for carrying out a variable-length decoding process on input coded data and outputting quantized data obtained as a result of the variable-length decoding process to the AC/DC prediction section 122.

The AC/DC prediction section 122 is a section for carrying out an AC/DC prediction process on the basis of the quantized data received from the variable-length decoding section 121 and supplying the result of the AC/DC prediction process to the inverse quantization section 123.

A DC prediction method is a method for comparing the changes of the DC components of the left MB and the upper-left MB with the changes of the DC components of the upper-left MB and the upper MB in order to predict the DC component of the current MB from a position separated away from the current MB a direction with a smaller gradient.

The AC prediction method is not a method of encoding by merely quantizing a DCT (Discrete Cosine Transform) coefficient for a pixel block encoded without adopting the inter-frame prediction technique. Instead, the AC prediction method is a method for reducing the code quantity by encoding differences in value between the current block and an upper adjacent block or a left adjacent block for values of the uppermost row of the DCT coefficient matrix or the leftmost column of the DCT coefficient matrix.

The inverse quantization section 123 is a section for carrying out an inverse quantization process on data quantized by the AC/DC prediction section 122 for every MB (macroblock), that is, in MB units each typically consisting of 16 pixels×16 lines (or 8 pixels×8 lines of 4 pixels×4 lines), in order to produce DCT (Discrete Cosine Transform) coefficient data as a result of the inverse quantization process. The inverse quantization section 123 supplies the DCT coefficient data to the inverse orthogonal transform section 124.

The inverse orthogonal transform section 124 is a section for carrying out an IDCT (Inverse Discrete Cosine Transform) process on the DCT coefficient data received from the inverse quantization section 123 in order to produce pixel data. The inverse orthogonal transform section 124 supplies the pixel data to the overlap smoothing section 125.

The overlap smoothing section 125 is a section for carrying out a filtering process on the image data in order to smooth block boundaries of the image data received from the inverse orthogonal transform section 124. As a result of the filtering process, the overlap smoothing section 125 produces image data with reduced distortions generated on the block boundaries. The overlap smoothing section 125 supplies post-filtering data obtained as a result of the filtering process to the loop filter 170 which serves as a deblocking processing section.

The inter MB processing section 130 employs a variable-length decoding section 131, an inverse quantization section 132 and an inverse orthogonal transform section 133.

The variable-length decoding section 131 is a section for carrying out a variable-length decoding process on input coded data and outputting quantized data obtained as a result of the variable-length decoding process to the inverse quantization section 132.

The inverse quantization section 132 is a section for carrying out an inverse quantization process on data quantized by the variable-length decoding section 131 for each MB (macroblock), that is, in MB units each typically consisting of 16 pixels×16 lines (or 8 pixels×8 lines of 4 pixels×4 lines) in order to produce DCT (Discrete Cosine Transform) coefficient data as a result of the inverse quantization process. The inverse quantization section 132 supplies the DCT coefficient data to the inverse orthogonal transform section 133.

The inverse orthogonal transform section 133 is a section for carrying out an IDCT (Inverse Discrete Cosine Transform) process on the DCT coefficient data received from the inverse quantization section 132 in order to produce pixel data. The inverse orthogonal transform section 133 supplies the pixel data to the adder 160.

The motion-vector decoding and prediction section 140 employs an MV (Motion Vector) decoding unit 141 and an MV (Motion Vector) prediction unit 142.

The motion-vector decoding section 141 is a section for carrying out a variable-length decoding process on input coded data in order to decode a motion vector based on the input coded data and outputting a result of the variable-length decoding process to the motion-vector prediction section 142.

The motion-vector prediction section 142 is a section for carrying out a hybrid MV prediction process. The hybrid MV prediction process is a prediction process carried out on the basis of the result of the decoding process. The motion-vector prediction section 142 also embeds hybrid prediction information to be used to indicate whether or not it is necessary to carry out a deblocking process into the motion-vector data obtained as a result of the hybrid motion-vector prediction process so as to allow the motion-vector data to be reutilized when the deblocking process is carried out. For example, the motion-vector prediction section 142 embeds the hybrid prediction information into the motion-vector data by setting the least significant bit at 0 or 1.

The motion-vector prediction section 142 supplies the motion-vector data including the embedded hybrid prediction information to the motion compensation section 150 and a memory MRY to be stored therein. The loop filter 170 serving as a deblocking processing section makes accesses to the memory MRY.

Next, the following description explains the motion-vector data according to the embodiment and the hybrid MV prediction process carried out in accordance with the embodiment.

Figure 7:
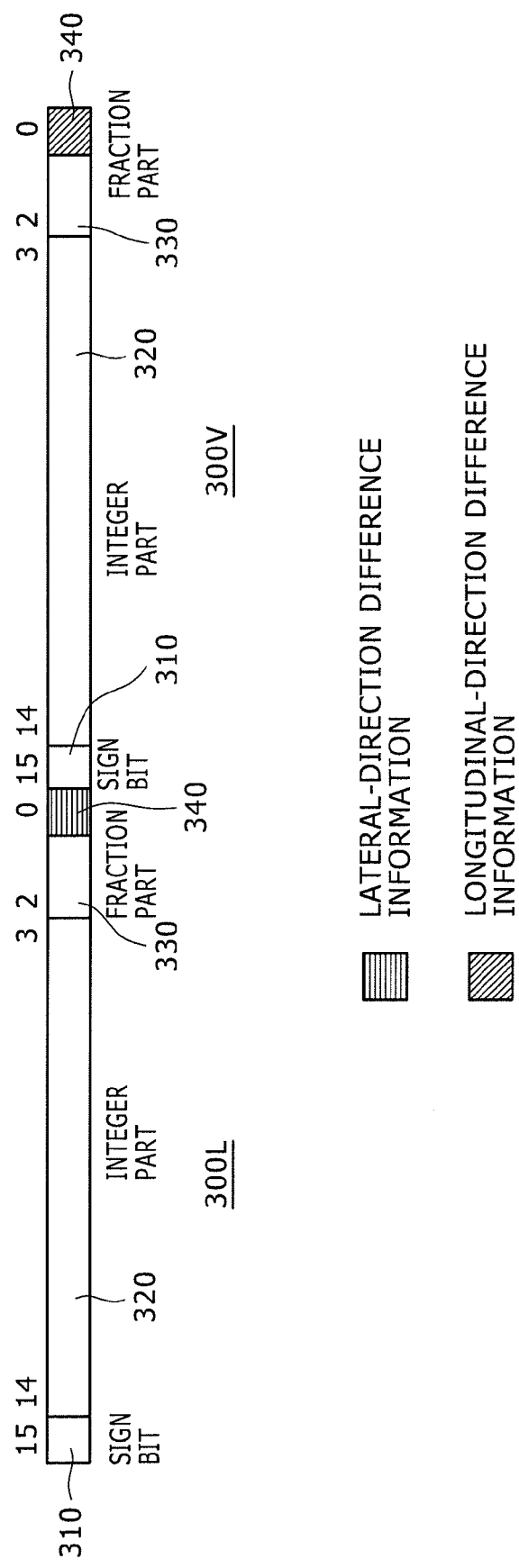
FIG. 7 is a diagram showing a typical structure of motion-vector data according to the embodiment.

FIG. 7 is a diagram showing a typical structure of the motion-vector data according to the embodiment.

As shown in FIG. 7, motion-vector data 300 conforming to the VC-1 specifications includes horizontal-direction (longitudinal-direction) motion-vector data 300L and vertical-direction (lateral-direction) motion-vector data 300V which represent a position on the referenced image. Each of the data 300L and 300V has the fixed-point format including:
(1): a sign bit part 310,
(2): an integer part 320 and
(3): a fraction part 330.

The bit length of each of the integer part 320 and the fraction part 330 in the motion-vector data 300 is not prescribed in the VC-1 specifications. Thus, the decoder designer can set each of the bit lengths at any number with a high degree of freedom as long as each of the bit lengths is large enough for decoding a moving image being processed.

In order to satisfy the ¼-pixel precision requirement of the motion compensation process, the fraction part 330 is required to include at least 2 bits. On the other hand, an 11-bit bit length of the integer part 320 is sufficient for expressing a 2,048-pixel horizontal-direction resolution for a process of decoding an HD (High-Definition) moving image. Thus, in the case of a system for storing motion-vector data as data consisting of 16 bits, the 16-bit motion-vector data includes 2 unused bits.

In this embodiment, if the motion-vector data includes unused bits as described above, the format of the motion-vector data is set to include the unused bits as least significant bits of the motion-vector data. In FIG. 7, the unused bits are shown as hatched portions 340. A result of a difference computation process carried out as a part of the hybrid motion-vector prediction process performed prior to the deblocking process is stored in the least significant bit 340 of the motion-vector data 300 (that is, either the horizontal-direction motion-vector data 300L or the vertical-direction motion-vector data 300V). The so-called hybrid prediction information (or the so-called difference information) obtained as the result of the difference computation process is used for determining the necessity to carry out the deblocking process.

The hybrid motion-vector prediction process is a part of a motion-vector prediction process. In the motion-vector prediction process, the motion vector of a predicted block is compared with the motion vector of a block adjacent to the predicted block and, if the result of the comparison indicates that the difference in motion vector between the predicted and adjacent blocks is greater than a threshold value, the motion vector of the predicted block is replaced by the motion vector of the adjacent block.

The result of a process to compute a difference in motion vector between the predicted and adjacent blocks in the hybrid motion-vector prediction process is the sum of the absolute values of aforementioned x and y differences between the motion vector of the predicted block and the motion vector of the adjacent block separated away from the predicted block in the vertical direction as well as the sum of the absolute values of x and y differences between the motion vector of the predicted block and the motion vector of the adjacent block separated away from the predicted block in the horizontal direction. The sum is an integer of up to 16 bits.

In this embodiment, a comparison instruction is used to set 1-bit data as information on the difference between motion vectors. The 1-bit data has a value of 1 indicating that the difference exists or a value of 0 indicating that the difference does not exist. That is to say, the information on the difference between motion vectors is information having a length of 1 bit.

Figure 8:
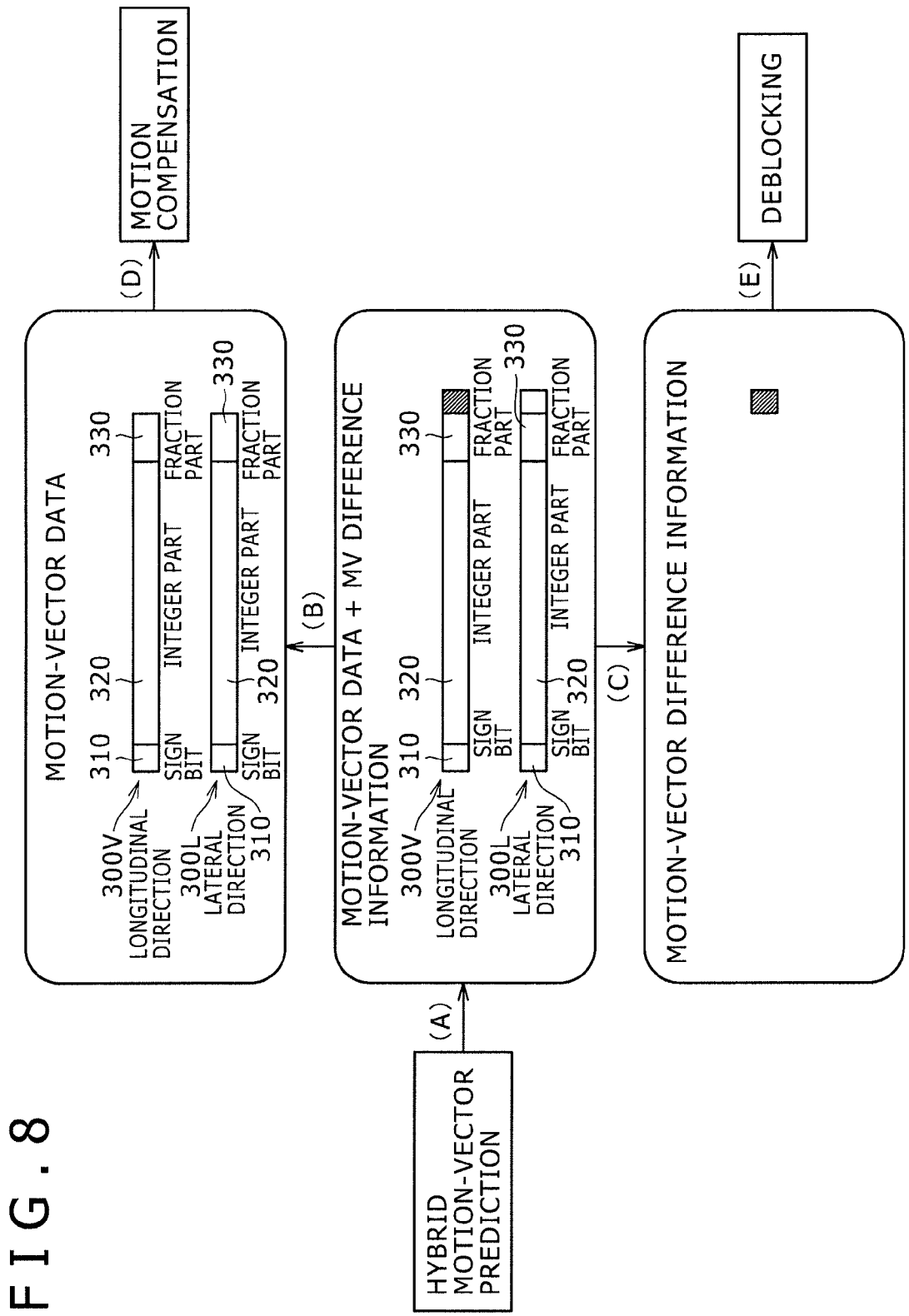
FIG. 8 is a diagram showing a variety of data contents produced and used in various kinds of processing related to a hybrid motion-vector prediction process generating motion-vector data the contents of which are produced and used in the processing.

The processing carried out by the embodiment can be summarized into processes (A) to (E) shown in a diagram of FIG. 8. In process (A), information on the difference between motion vectors is added to either the vertical-direction motion-vector data 300V or the horizontal-direction motion-vector data 300L and embedded at the position of the least significant bit of the least significant bit 340 in accordance with a technique according to the embodiment. As described earlier, the horizontal-direction motion-vector data 300L is the horizontal-direction component of the motion-vector data 300 obtained as a result of the hybrid motion-vector prediction process carried out by the motion-vector prediction section 142 shown in the block diagram of FIG. 5. On the other hand, the vertical-direction motion-vector data 300V is vertical-direction component of the motion-vector data 300 obtained as a result of the hybrid motion-vector prediction process.

In order to use the motion-vector data 300 in a motion compensation process, process (B) is executed to mask out the information on the difference between motion vectors from the motion-vector data 300 and, then, process (D) is carried out to supply the motion-vector data 300 to the motion compensation process to be performed by the motion compensation section 150 shown in the block diagram of FIG. 5.

On the other hand, process (C) is carried out to mask out the motion-vector data 300 in order to retrieve only the information on the difference between motion vectors from the motion-vector data 300 and, then, process (E) is performed to supply the information on the difference between motion vectors to the deblocking process to be executed by the loop filter 170 shown in the block diagram of FIG. 5 to serve as a deblocking processing section.

The motion compensation section 150 is capable of selecting the value of ½ or ¼ at which the pixel precision of the motion vector is to be set and carries out the so-called fraction-precision pixel compensation process at the selected pixel precision in picture units by making use of the motion-vector data 300 received from the motion-vector decoding and prediction section 140 as shown in the block diagram of FIG. 5.

That is to say, the motion compensation section 150 carries out an operation in accordance with control executed by the motion-vector decoding and prediction section 140. If the adder 160 is processing an I picture, the motion compensation section 150 supplies no data to the adder 160. If the adder 160 is processing a P picture, on the other hand, the motion compensation section 150 provides the adder 160 with processed data obtained as a result of a predetermined process carried out on image data corresponding to a past frame read out from the frame buffer 180. In addition, if the adder 160 is processing a B picture, the motion compensation section 150 provides the adder 160 with processed data obtained as a result of a predetermined process carried out on image data corresponding to a future frame read out from the frame buffer 180.

The strength compensation section 190 is a section for carrying out processing such as a scaling process on the data read out from the frame buffer 180.

The adder 160 is a section for adding data output by the motion compensation section 150 to image data output by the inter MB processing section 130 and supplying data obtained as a result of the addition to the loop filter 170 which serves as the deblocking processing section.

The loop filter 170 is a section for carrying out a deblocking process in accordance with the 1-bit difference information included as the least significant bit 340 in the motion-vector data 300 typically read out from the memory MRY. If the information on the difference indicates that the difference in motion vector between the predicted and adjacent blocks is greater than a predetermined threshold value of 32, the inter MB processing section 130 carries out the next process. In the replacement process, the loop filter 170 replaces the current motion vector with the adjacent motion vector compared with the current vector in order to reduce the number of accesses made during the deblocking process as accesses to the memory MRY and, thus, the number of cache misses. Thus, the entire processing can be carried out at a higher speed.

Next, the following description more concretely explains operations carried out by the embodiment during the hybrid motion-vector prediction process and the deblocking process and also more concretely explains an operation principle to determine the execution of the deblocking process which conforms to the VC-1 specifications. The following description is given for a P frame.

<Determination of Execution of the Deblocking Process>

The necessity to carry out a deblocking process on each block boundary in a P frame processed by a video decoder conforming to the VC-1 specifications is determined in accordance with two methods described as follows:

(1): The motion vectors of two adjacent blocks sandwiching a block boundary are compared with each other and, if the result of the comparison indicates that the motion vectors of the two adjacent blocks are different from each other, a deblocking process is carried out on the block boundary.

(2): If the data of the block bordering upon a block boundary is composed of not only data of a referenced image including the block, but also data added from a bit stream, a deblocking process is carried out on the block boundary.

In order to determine whether or not it is necessary to carry out a deblocking process on a block boundary in accordance with method (1) described above, it is necessary to make accesses to a memory in an operation to load motion-vector data from the memory for the purpose of comparisons. Since each motion-vector data 300 has a vertical-direction component 300V and a horizontal-direction component 300L as described earlier by referring to the diagram of FIG. 7, the vertical-direction and horizontal-direction components 300V and 300L of the two pieces of motion-vector data 300 of two adjacent upper and left blocks are loaded from the memory in four memory accesses in an operation to compare the pieces of motion-vector data 300 of the two adjacent blocks with each other.

In the case of a video decoder conforming to the VC-1 specifications, however, the motion vectors of the two adjacent blocks have been compared with each other in the hybrid motion-vector prediction process carried out prior to the deblocking process to be carried out so that the result of the comparison can be utilized.

Thus, when the loop filter 170 carries out a deblocking process in accordance with this embodiment, the loop filter 170 reutilizes the result of the comparison without making the unnecessary accesses to the memory MRY. That is to say, only accesses fewer than four need to be made as accesses to the memory MRY in order to load the vertical-direction and horizontal-direction components 300V and 300L of the two pieces of motion-vector data of 2 adjacent blocks.

<Reference to Motion-Vector Data in Determination of Execution of the Deblocking Process>

Figure 11:
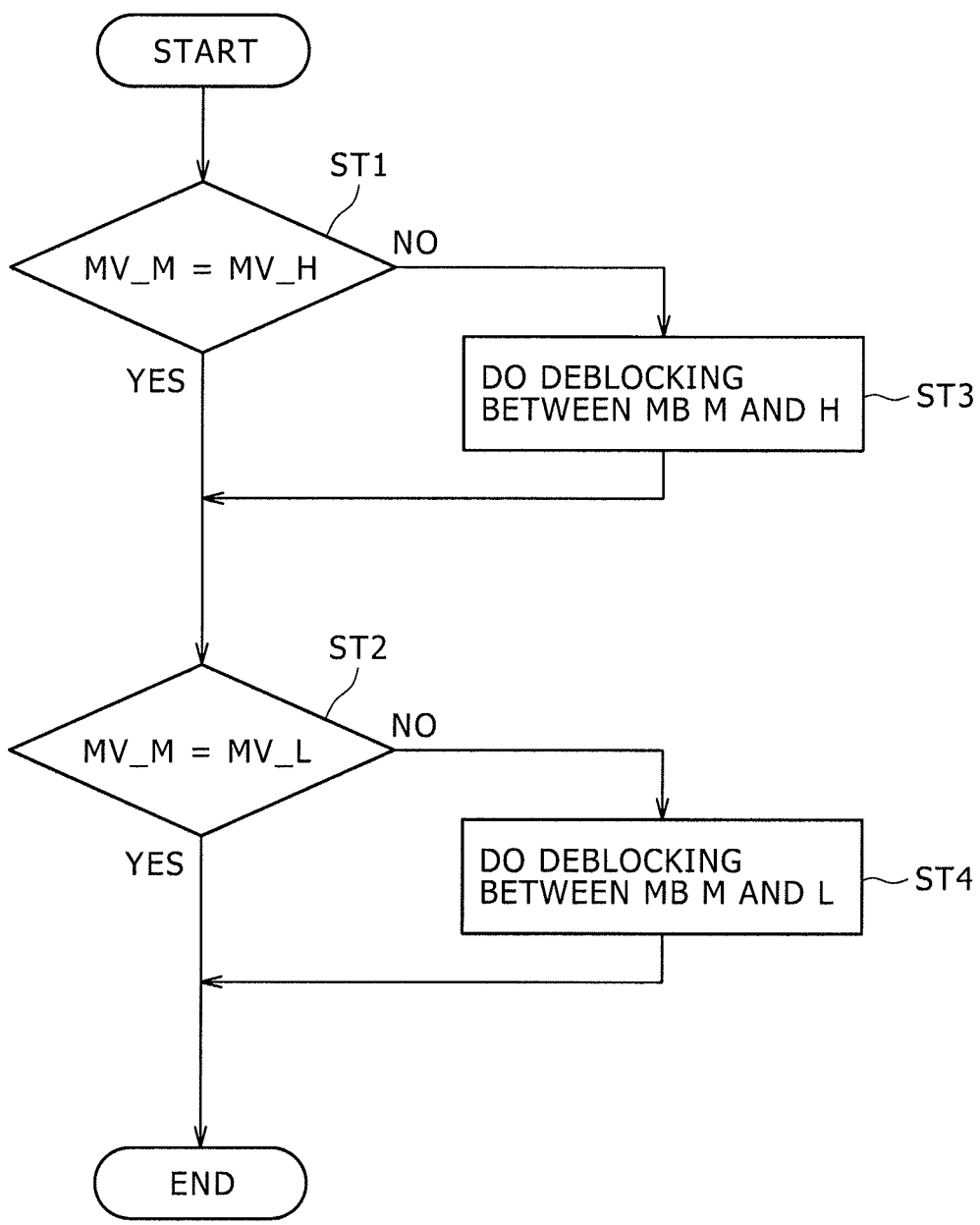
FIG. 11 shows a flowchart representing basic processing carried out on the basis of motion-vector data of MBs in order to determine whether or not it is necessary to carry out the deblocking process on the MB.

FIG. 9 is a diagram showing a frame which has a horizontal-direction size of 80 pixels and a vertical-direction size of 64 pixels and is divided into twenty 16-pixel×16-pixel MB (microblocks) denoted by capital letters A to T respectively. FIG. 10 is a diagram putting emphasis on some of the MBs shown in the diagram of FIG. 9. The emphasized MBs are referenced upper and left adjacent MBs H and L used for determining the necessity to carry out the deblocking process on the MB M. FIG. 11 shows a flowchart representing basic processing carried out on the basis of motion-vector data of an MB in order to determine whether or not it is necessary to carry out the deblocking process on the MB.

In the processing carried out on the basis of motion-vector data in order to determine whether or not it is necessary to carry out the deblocking process on an MB M in accordance with the VC-1 specifications, as shown in the flowchart of FIG. 10, the motion vector MV_M of the MB M is compared with the motion vector MV_H of the upper adjacent MB H above the MB M at a step ST1 whereas the motion vector MV_M of the MB M is compared with the motion vector MV_L of the left adjacent MB L on the left-hand side of the MB M at a step ST2. If the comparison result produced in the comparison operation carried out at the step ST1 indicates that the motion vector MV_M of the MB M is different from the motion vector MV_H of the upper adjacent MB H, the deblocking process is carried out on the block boundary between the MB M and the upper adjacent MB H at a step ST3. By the same token, if the comparison result produced in the comparison operation carried out at the step ST2 indicates that the motion vector MV_M of the MB M is different from the motion vector MV_L of the left adjacent MB L, the deblocking process is carried out on the block boundary between the MB M and the left adjacent MB L at a step ST4.

As is obvious from the processing represented by the flowchart, in order to determine whether or not it is necessary to carry out the deblocking process on an MB M, it is necessary to read out data of the motion vector MV_H of the upper adjacent MB H and data of the motion vector MV_L of the left adjacent MB L from the memory MRY.

Figure 12:
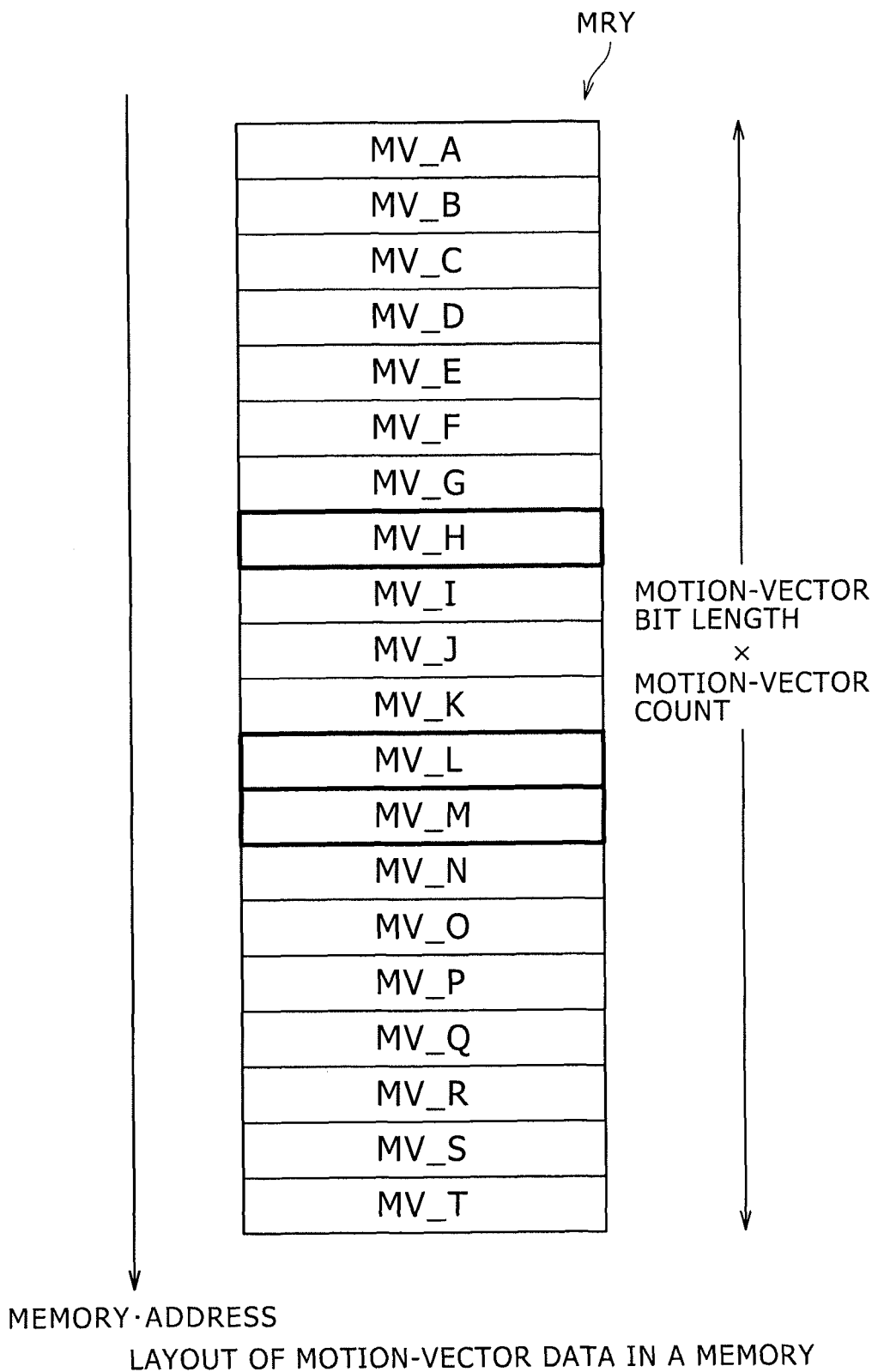
FIG. 12 is a diagram showing a typical layout of pieces of motion-vector data stored in a memory.

FIG. 12 is a diagram showing a typical layout of pieces of motion-vector data stored in the memory MRY.

In the typical layout shown in the diagram of FIG. 12, the data of the motion vector MV_L of the left adjacent MB L is stored at a location adjacent to the location of the data of the motion vector MV_M of the MB M but the data of the motion vector MV_H of the upper adjacent MB H is stored at a location far away from the location of the data of the motion vector MV_M of the MB M. Thus, in the process of determining the necessity to carry out the deblocking process on an MB M, it is quite within the bounds of possibility that a cache miss occurs in an access which is made as an access to the memory MRY in order to read out the data of the motion vector MV_H of the upper adjacent MB H.

<Elimination of Accesses to the Memory to Refer to MV Data by Utilization of a Result of the Hybrid MV Prediction when a Deblocking Process is Carried Out>

As described earlier, in accordance with this embodiment, the motion-vector data resulting from the hybrid motion-vector prediction process is reutilized in the process of determining the necessity to carry out the deblocking process in order to reduce the number of cache misses in accesses which are each made as an access to the memory MRY in an attempt to read out the data of the motion vector of an MB adjacent to the specific MB.

In addition to the processing carried out in the ordinary MV prediction process, the hybrid motion-vector prediction process also replaces a predicted MV with an MV adjacent to the predicted MV if the difference between the predicted and adjacent MVs is greater than a threshold value determined in advance. The predicted MV is replaced with an MV adjacent to the predicted MV in so-called deblocking execution determination processing explained as follows.

Figure 13:
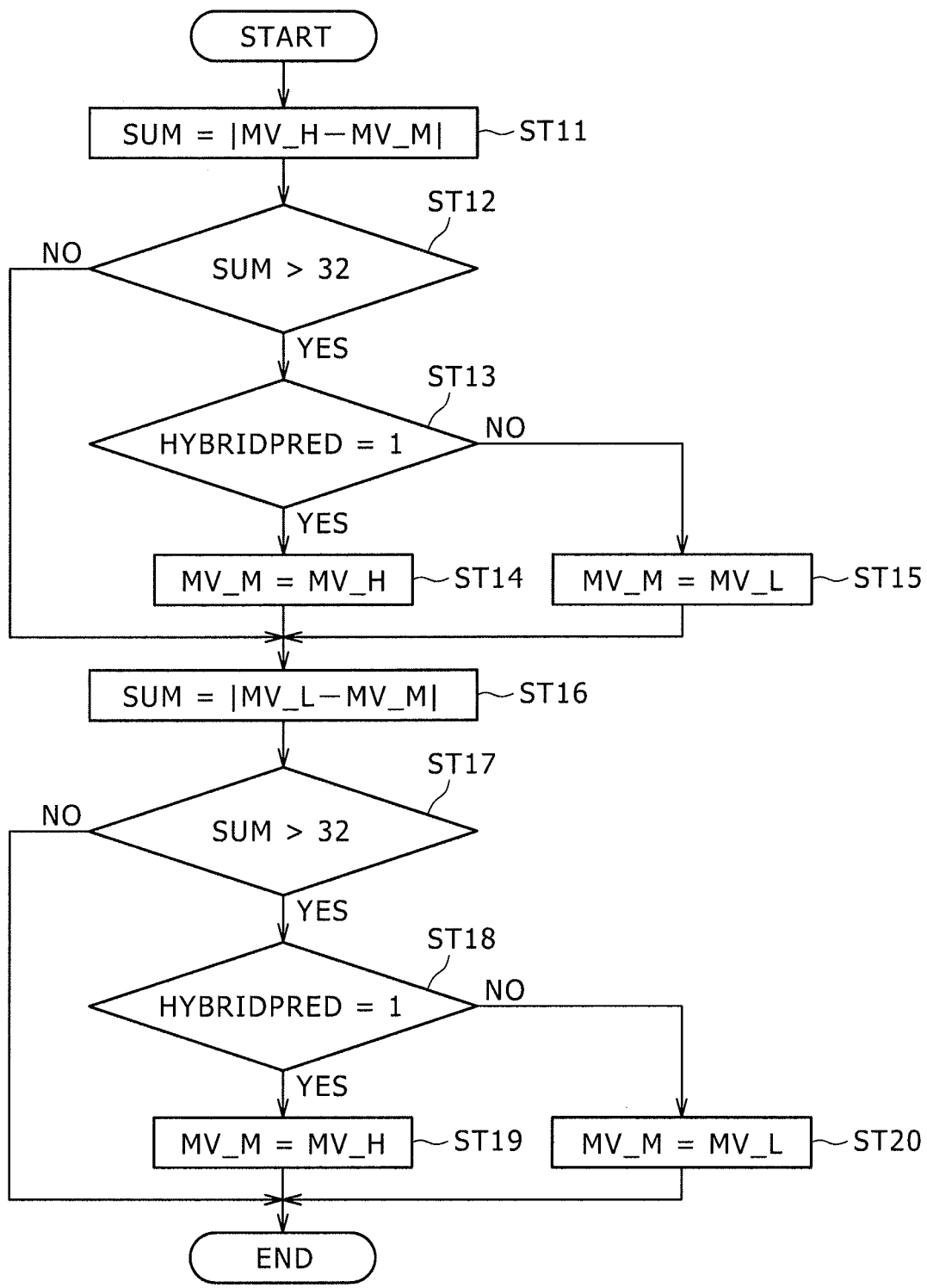
FIG. 13 shows a flowchart representing deblocking determination processing in which the MB M is subjected to a hybrid motion-vector prediction process.

FIG. 13 shows a flowchart representing deblocking determination processing to replace the motion vector of a current block (the MB M) obtained as a result of a hybrid MV (motion-vector) prediction process with the motion vector of a block adjacent to the current block.

As shown in FIG. 13, the flowchart begins with a step ST11 at which the motion-vector prediction section 142 computes a longitudinal-direction variable SUM representing the sum of the absolute values of x and y differences between the motion vector MV_M of the current MB M and the motion vector MV_M of an MB H existing at an adjacent location separated away from the current MB M in the upward vertical direction. In this patent specification, the x difference between motion vectors of the current and adjacent blocks is a difference between the x-axis-direction component (or a horizontal-direction component) of the motion vector of the current block and the x-axis-direction component (or a horizontal-direction component) of the motion vector of the adjacent block whereas the y difference between motion vectors of the current and adjacent blocks is a difference between the y-axis-direction component (or a vertical-direction component) of the motion vector of the current block and the y-axis-direction component (or a vertical-direction component) of the motion vector of the adjacent block.

Then, at the next step ST12, the motion-vector prediction section 142 compares the longitudinal-direction variable SUM with a predetermined threshold value of 32 in order to produce a result of determination as to whether or not the longitudinal-direction variable SUM is greater than threshold value of 32.

If the determination result produced at this step indicates that the longitudinal-direction variable SUM is greater than threshold value of 32, the motion-vector prediction section 142 sets a hybrid flag HYBRIDPRED stored at the position of the least significant bit 340 of the motion-vector data 300 (that is, either the horizontal-direction motion-vector data 300L or the vertical-direction motion-vector data 300V) of the current MB M at 1.

If the determination result produced at this step indicates that the longitudinal-direction variable SUM is not greater than threshold value of 32, on the other hand, the motion-vector prediction section 142 sets the hybrid flag HYBRIDPRED stored at the position of the least significant bit 340 of the motion-vector data 300 of the current MB M at 0.

It is to be noted that the operations carried out by the motion-vector prediction section 142 to set the hybrid flag HYBRIDPRED at 1 or 0 are not shown in the flowchart of FIG. 13.

In the mean time, the decoded image data of an inter MB for which the motion compensation process has been carried out by the motion compensation section 150 is supplied to the loop filter 170 serving as a deblocking processing section by way of the adder 160.

In the loop filter 170, the hybrid flag HYBRIDPRED is referenced as a flag indicating whether the motion vector of a left or upper adjacent block is to be used in a process of replacing the motion vector of the current in a stream conforming to the VC-1 specifications as follows.

At a step ST13, the loop filter 170 serving as a deblocking processing section produces a result of determination as to whether or not the hybrid flag HYBRIDPRED stored at the position of the least significant bit 340 of the motion-vector data 300 is equal to 1 in a deblocking execution determination process. If the determination result produced at this step indicates that the hybrid flag HYBRIDPRED is equal to 1, the flow of the processing goes on to a step ST14 at which the loop filter 170 replaces the motion vector MV_M of the current MB M with the motion vector MV_H of the upper adjacent MB H. If the determination result produced at this step indicates that the hybrid flag HYBRIDPRED is equal to 0, on the other hand, the flow of the processing goes on to a step ST15 at which the loop filter 170 replaces the motion vector MV_M of the current MB M with the motion vector MV_L of the left adjacent MB L.

Concurrently with the processes carried out at the steps ST11 to ST15 described above, at a step ST16, the motion-vector prediction section 142 computes a lateral-direction variable SUM representing the sum of the absolute values of x and y differences between the motion vector MV_M of the current MB M and the motion vector MV_L of an MB L existing at an adjacent location separated away from the current MB M in the left direction.

Then, at the next step ST17, the motion-vector prediction section 142 compares the lateral-direction variable SUM with the predetermined threshold value of 32 in order to produce a result of determination as to whether or not the lateral-direction variable SUM is greater than threshold value of 32.

If the determination result produced at this step indicates that the lateral-direction variable SUM is greater than threshold value of 32, the motion-vector prediction section 142 sets the hybrid flag HYBRIDPRED stored at the position of the least significant bit 340 of the motion-vector data 300 (that is, either the horizontal-direction motion-vector data 300L or the vertical-direction motion-vector data 300V) of the current MB M at 1.

If the determination result produced at this step indicates that the lateral-direction variable SUM is not greater than threshold value of 32, on the other hand, the motion-vector prediction section 142 sets the hybrid flag HYBRIDPRED at 0. It is to be noted that the operations carried out by the motion-vector prediction section 142 to set the hybrid flag HYBRIDPRED at 1 and 0 are not shown in the flowchart of FIG. 13.

In the mean time, the decoded image data of an inter MB for which the motion compensation process has been carried out by the motion compensation section 150 is supplied to the loop filter 170 serving as a deblocking processing section by way of the adder 160.

At a step ST18, the loop filter 170 serving as a deblocking processing section produces a result of determination as to whether or not the hybrid flag HYBRIDPRED stored at the position of the least significant bit 340 of the motion-vector data 300 of the current MB M is equal to 1 in the deblocking execution determination process.

If the determination result produced at this step indicates that the hybrid flag HYBRIDPRED is equal to 1, the flow of the processing goes on to a step ST19 at which the loop filter 170 replaces the motion vector MV_M of the current MB M with the motion vector MV_H of the upper adjacent MB H.

If the determination result produced at this step indicates that the hybrid flag HYBRIDPRED is equal to 0, on the other hand, the flow of the processing goes on to a step ST20 at which the loop filter 170 replaces the motion vector MV_M of the current MB M with the motion vector MV_L of the left adjacent MB L.

As is obvious from the description of the deblocking execution determination processing, the motion-vector prediction section 142 has already computed the difference in motion vector in the hybrid motion-vector prediction process.

Thus, in the deblocking execution determination processing performed in accordance with the embodiment, it is not necessary to load MV (motion-vector) data from the memory MRY and store motion-vector data into the memory MRY. That is to say, it is not necessary to make several accesses to motion-vector data of blocks adjacent to the current block.

Next, the following description explains a process carried out in the hybrid motion-vector prediction processing to store the information on a difference between motion vectors into motion-vector data.

Figure 14:
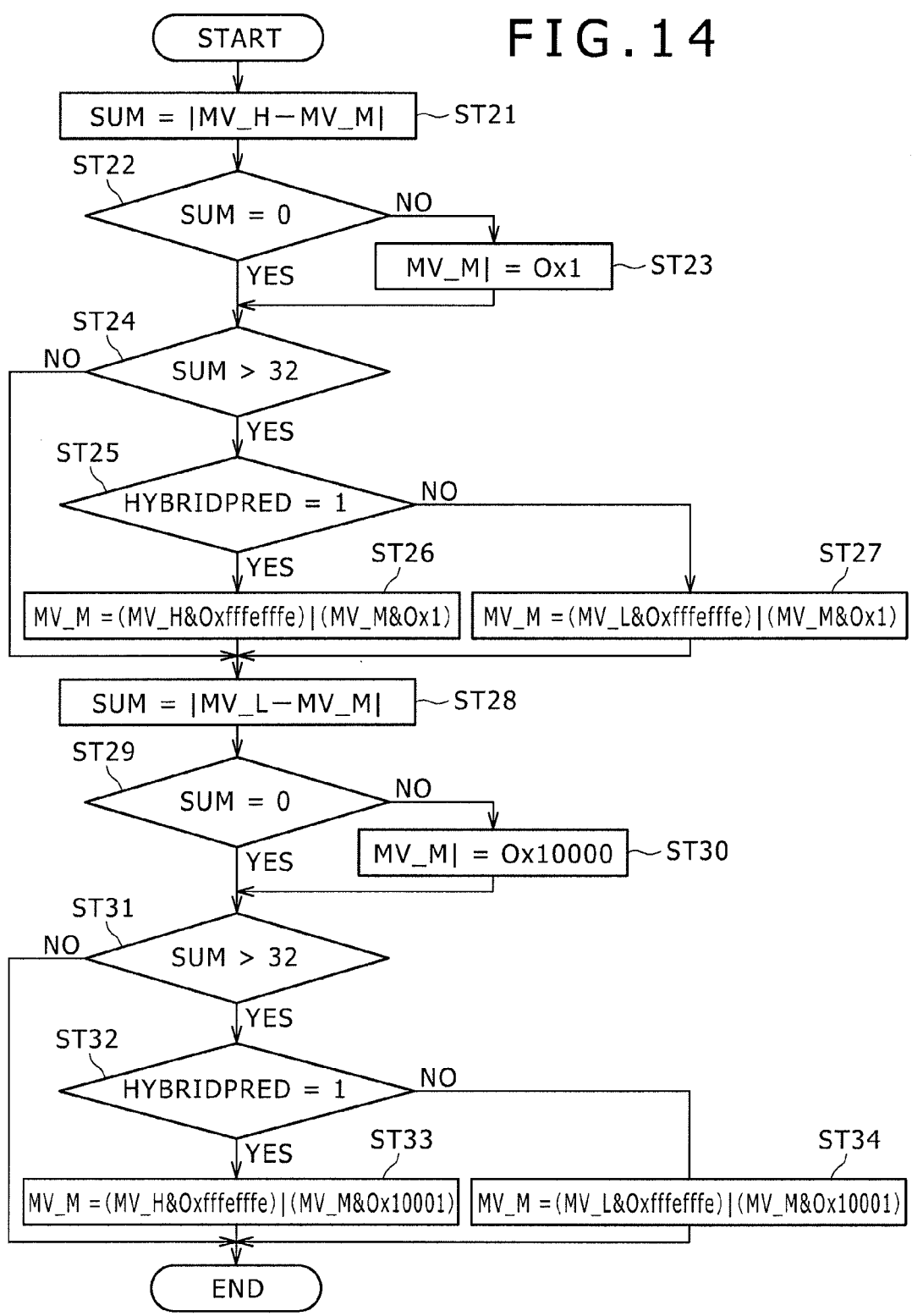
FIG. 14 shows a flowchart representing a process for embedding motion vector difference information into motion-vector data at the time of the hybrid motion-vector prediction.

FIG. 14 shows a flowchart representing detailed deblocking determination processing including detailed deblocking execution determination processing to replace the motion vector of a current block (the MB M) obtained as a result of a hybrid MV (motion-vector) prediction process with the motion vector of a block adjacent to the current block.

As shown in FIG. 14, the flowchart begins with a step ST21 at which the motion-vector prediction section 142 computes a longitudinal-direction variable SUM representing the sum of the absolute values of x and y differences between the motion vector MV_M of the current MB M and the motion vector MV_H of an MB H existing at an adjacent location separated away from the current MB M in the upward vertical direction.

Then at the next step ST22, the motion-vector prediction section 142 compares the longitudinal-direction variable SUM with 0 in order to produce a result of determination as to whether or not the longitudinal-direction variable SUM is equal to 0. If the determination result produced at the step ST22 indicates that the longitudinal-direction variable SUM is not equal to 0, the flow of the processing goes on to a step ST23 at which the motion-vector prediction section 142 sets the motion vector MV_M of the current MB M at 0x1 where notation '0x' denotes a hexadecimal format.

Then, at the next step ST24, the motion-vector prediction section 142 compares the longitudinal-direction variable SUM with a predetermined threshold value of 32 in order to produce a result of determination as to whether or not the longitudinal-direction variable SUM is greater than threshold value of 32.

If the determination result produced at this step indicates that the longitudinal-direction variable SUM is greater than threshold value of 32, the motion-vector prediction section 142 sets a hybrid flag HYBRIDPRED stored at the position of the least significant bit 340 of the motion-vector data 300 (that is, either the horizontal-direction motion-vector data 300L or the vertical-direction motion-vector data 300V) of the current MB M at 1. If the determination result produced at this step indicates that the longitudinal-direction variable SUM is not greater than threshold value of 32, on the other hand, the motion-vector prediction section 142 sets the hybrid flag HYBRIDPRED stored at the position of the least significant bit 340 of the motion-vector data 300 at 0.

Then, at the next step ST25, the motion-vector prediction section 142 produces a result of determination as to whether or not the hybrid flag HYBRIDPRED is equal to 1. If the determination result produced at this step indicates that the hybrid flag HYBRIDPRED is equal to 1, the flow of the processing goes on to a step ST26 at which the motion-vector prediction section 142 makes use of the motion vector MV_H compared with the current motion vector MV_M as a substitute for the current motion vector MV_M. In the case of the processing represented by the flowchart shown in FIG. 14, the current motion vector MV_M is replaced with an expression of MV_H&0xfffefffe|Mv_M&0x1.

If the determination result produced at this step indicates that the hybrid flag HYBRIDPRED is equal to 0, on the other hand, the flow of the processing goes on to a step ST27 at which the motion-vector prediction section 142 makes use of the motion vector MV_L compared with the current motion vector MV_M as a substitute for the current motion vector MV_M. In the case of the processing represented by the flowchart shown in FIG. 14, the current motion vector MV_M is replaced with an expression of MV_L&0xfffefffe|Mv_M&0x1.

Concurrently with the processes carried out at the steps ST21 to ST27 described above, at a step ST28 the motion-vector prediction section 142 computes a lateral-direction variable SUM representing the sum of the absolute values of x and y differences between the motion vector MV_M of the current MB M and the motion vector MV_L of an MB L existing at an adjacent location separated away from the current MB M in the left direction.

Then at the next step ST29, the motion-vector prediction section 142 compares the lateral-direction variable SUM with 0 in order to produce a result of determination as to whether or not the lateral-direction variable SUM is equal to 0. If the determination result produced at the step ST29 indicates that the lateral-direction variable SUM is not equal to 0, the flow of the processing goes on to a step ST30 at which the motion-vector prediction section 142 sets the motion vector MV_M of the current MB M at 0x10000.

Then, at the next step ST31, the motion-vector prediction section 142 compares the lateral-direction variable SUM with a predetermined threshold value of 32 in order to produce a result of determination as to whether or not the lateral-direction variable SUM is greater than threshold value of 32.

If the determination result produced at this step indicates that the lateral-direction variable SUM is greater than threshold value of 32, the motion-vector prediction section 142 sets a hybrid flag HYBRIDPRED stored at the position of the least significant bit 340 of the motion-vector data 300 (that is, either the horizontal-direction motion-vector data 300L or the vertical-direction motion-vector data 300V of the current MB M at 1.

If the determination result produced at this step indicates that the lateral-direction variable SUM is not greater than threshold value of 32, on the other hand, the motion-vector prediction section 142 sets the hybrid flag HYBRIDPRED stored at the position of the least significant bit 340 of the motion-vector data 300 of the current MB M at 0.

Then, at the next step ST32, the motion-vector prediction section 142 (the loop filter 170???) produces a result of determination as to whether or not the hybrid flag HYBRIDPRED stored at the position of the least significant bit 340 of the motion-vector data 300 of the current MB M is equal to 1. If the determination result produced at this step indicates that the hybrid flag HYBRIDPRED is equal to 1, the flow of the processing goes on to a step ST33 at which the motion-vector prediction section 142 makes use of the motion vector MV_H compared with the current motion vector MV_M as a substitute for the current motion vector MV_M. In the case of the processing represented by the flowchart shown in FIG. 14, the current motion vector MV_M is replaced with an expression of MV_H&0xfffefffe|MV_M&0x10001.

If the determination result produced at this step indicates that the hybrid flag HYBRIDPRED is equal to 0, on the other hand, the flow of the processing goes on to a step ST34 at which the motion-vector prediction section 142 makes use of the motion vector MV_L compared with the current motion vector MV_M as a substitute for the current motion vector MV_M. In the case of the processing represented by the flowchart shown in FIG. 14, the current motion vector MV_M is replaced with an expression of MV_L&0xfffefffe|MV_M&0x10001.

As described above, in accordance with the embodiment, in a hybrid motion-vector prediction process, the hybrid prediction information, that is, the difference information of an adjacent MV (motion vector) compared with the current MV is embedded into the current MV as shown in the flowchart of FIG. 14. The positions to which the difference information is embedded are shown in FIG. 7.

As already described earlier, each of the positions to which the difference information is embedded is the position of the least significant bit of the fraction part of the 16-bit fixed-point format which is a component of the motion vector. Since the fraction part requires only 2-bit precision, the least significant bit is available. Thus, even if the difference information is embedded into the position of the least significant bit, the data of the motion vector itself is by no means lost.

In an operation making use of the motion-vector data, the difference information is masked out. In an operation making use of the difference information, on the other hand, the motion-vector data is masked out. Thus, in such operations, it is possible to avoid the effect of the difference information on the motion-vector data and the effect of the motion-vector data on the difference information.

As described above, in accordance with the embodiment, the image processing apparatus 100 employs the motion-vector prediction section 142, the motion compensation section 150 and the loop filter 170 to serve as characteristic configuration sections.

The motion-vector prediction section 142 is a section for carrying out a hybrid motion-vector prediction process on the basis of a result of a motion-vector decoding process executed by performing a variable-length decoding process on received coded data in order to decode a motion vector expressed by the coded data as a part of video-signal decoding processing by execution of the function of a deblocking filter for reducing noises.

Then, the motion-vector prediction section 142 generates motion-vector data obtained as a result of the hybrid motion-vector prediction process. Subsequently, the motion-vector prediction section 142 embeds hybrid prediction information to be used to indicate whether or not it is necessary to carry out a deblocking process into the motion-vector data so as to allow the motion-vector data obtained as a result of the hybrid motion-vector prediction process to be reutilized when the deblocking process is carried out.

The motion compensation section 150 is a section for carrying out a motion compensation process for decoded image data by making use of the received motion-vector data.

The deblocking processing section 170 is a section for carrying out a deblocking process on the decoded image data completing the motion compensation process in accordance with the hybrid prediction information embedded in the motion-vector data.

Thus, for example, in the deblocking process carried out by the loop filter 170 employed in the image processing apparatus 100, the motion-vector data obtained as a result of the hybrid motion-vector prediction process carried out by the motion-vector prediction section 142 of the motion-vector decoding and prediction section 140 also employed in the image processing apparatus 100 is reutilized by the loop filter 170 in determination as to whether or not it is necessary to carry out the deblocking process in accordance with the hybrid prediction information embedded in the motion-vector data.

The image processing apparatus 100 according to this embodiment computes a difference in motion-vector data between a current block and an adjacent block A above the current block as well as a difference in motion-vector data between the current block and an adjacent block B on the left-hand side of the current block as shown in a diagram of FIG. 6. In the diagram of FIG. 6, reference notation cur_mv denotes the motion-vector data of the current block, reference notation predictor_A denotes the motion-vector data of the block A adjacent to the current block and reference notation predictor_B denotes the motion-vector data of the block B adjacent to the current block.

It is possible to provide a configuration in which the image processing apparatus 100 compares the sum of the x (horizontal-direction) and y (vertical-direction) differences between the motion vector of the current block and the motion vector of a block adjacent to the current block with a predetermined threshold value of 32. If the result of the comparison indicates that the sum of the x and y differences between the motion vectors of the current block and the adjacent is greater than 32, the motion vector of the current block is replaced by the motion vector of the compared adjacent block which gives the x and y differences.

Thus, the embodiment gives the following effects.
(1): Fewer Memory Accesses

Since the motion-vector data obtained as a result of the hybrid motion-vector prediction process is reutilized in determination as to whether or not it is necessary to carry out the deblocking process, the accesses to the motion-vector data of blocks adjacent to the current block can be eliminated. In the determination as to whether or not it is necessary to carry out the deblocking process, the motion vectors of two blocks adjacent to the current block are required. The two blocks adjacent to the current block is a block above the current block and a block on the left-hand side of the current block. Since the motion-vector data of each of the blocks adjacent to the current block includes a component in the vertical direction (or the y-axis direction) and a component in the horizontal direction or (the x-axis direction), a total of four accesses to a memory will otherwise be made in order to read out the motion-vector data of the two blocks adjacent to the current block from the memory. Thus, for every block taken as the current block, the four accesses to the motion-vector data of the two blocks adjacent to the current block can be eliminated.

(2): Reduced Amount of Processing

Since the motion-vector data is reutilized in determination as to whether or not it is necessary to carry out the deblocking process, the process to find the hybrid prediction information can be eliminated. Since the motion-vector data of each of the blocks adjacent to the current block includes a component in the vertical direction and a component in the horizontal direction, a total of four operations will otherwise be carried out in order to find the hybrid prediction information for the current block on the basis of the vertical and horizontal-direction components of the motion-vector data of the two blocks adjacent to the current block. Thus, four operations per block can be eliminated.

In addition, it is possible to provide a configuration in which the image processing method explained in detail so far is implemented by an image processing program according to the procedures represented by the flowcharts described previously, and a computer such a CPU executes the image processing program.

On top of that, it is possible to provide a configuration in which the image processing program to be executed by the computer is stored in advance in a recording medium which is then presented to the user. The image processing program is then installed in the computer from the recording medium by mounting the recording medium on the computer. Then, the computer executes the program by making accesses to the installed program. Typical examples of the recording medium are a semiconductor memory, a magnetic disk, an optical disk and a floppy (trademark) disk.

The present application contains subject matter related to that disclosed in Japanese Priority Patent Application JP 2008-119200 filed in the Japan Patent Office on Apr. 30, 2008, the entire content of which is hereby incorporated by reference.

It should be understood by those skilled in the art that a variety of modifications, combinations, sub-combinations and alterations may occur, depending on design requirements and other factors insofar as they are within the scope of the appended claims or the equivalents thereof.

What is claimed is:

1. An image processing apparatus comprising:
   an inverse quantization section configured to carry out an inverse quantization process on compressed image information obtained as a result of a quantization process performed after an orthogonal transform process executed in block units;
   an inverse orthogonal transform section configured to carry out an inverse orthogonal transform process on coefficient data obtained as a result of said inverse quantization process in order to output decoded image data;
   a motion-vector prediction section configured to (1) carry out a hybrid motion-vector prediction process on the basis of a result of a motion-vector decoding process executed by performing a variable-length decoding process, (2) generate motion-vector data obtained as a result of said hybrid motion-vector prediction process, and (3) embed hybrid prediction information to be used to indicate whether or not it is necessary to carry out a deblocking process into said motion-vector data so as to allow the result of said hybrid motion-vector prediction process to be reutilized at said deblocking process;
   a motion compensation section configured to carry out a motion compensation process for said decoded image data output by said inverse orthogonal transform section by making use of said motion-vector data received from said motion-vector prediction section;
   a deblocking processing section configured to carry out said deblocking process on said decoded image data completing said motion compensation process in accordance with said hybrid prediction information embedded in said motion-vector data; and
   a memory used for storing said motion-vector data in a state of being accessible to said deblocking processing section,
   wherein the necessity to carry out a deblocking process on each block boundary in a frame processed by a video decoder is determined in accordance with two methods (1) the motion vectors of two adjacent blocks sandwiching a block boundary are compared with each other and, and if the result of the comparison indicates that the motion vectors of the two adjacent blocks are different from each other, a deblocking process is carried out on the block boundary; and (2) if the data of the block bordering upon a block boundary is composed of not only data of a referenced image including the block, but also data added from a bit stream, a deblocking process is carried out on the block boundary.

2. The image processing apparatus according to claim 1 wherein one of said motion-vector prediction section and said deblocking processing section have a function to replace the motion vector of a current macroblock (MB) with the motion vector of a comparison MB compared with said current macroblock in accordance with said hybrid prediction information embedded in said motion-vector data.

3. The image processing apparatus according to claim 2 wherein said hybrid prediction information is embedded into a bit string representing said motion-vector data so as to occupy the position of a bit not required in processing making use of said motion-vector data.

4. The image processing apparatus according to claim 3 wherein said motion-vector data is data having a fixed-point format.

5. The image processing apparatus according to claim 4 wherein said fixed-point format includes a sign bit part, an integer part and a fraction part, and said hybrid prediction information is embedded into said motion-vector data to occupy the position of the least significant bit of said motion-vector data.

6. The image processing apparatus according to claim 2 wherein
   said motion-vector data is created for each of the vertical and horizontal directions of coordinates of a position on a referenced image, and
   said hybrid prediction information is embedded into a bit string representing said motion-vector data so as to occupy said position of a bit not required in processing making use of said motion-vector data.

7. The image processing apparatus according to claim 6 wherein said motion-vector data is data having a fixed-point format.

8. The image processing apparatus according to claim 7 wherein said fixed-point format includes a sign bit part, an integer part and a fraction part, and said hybrid prediction information is embedded into said motion-vector data to occupy the position of the least significant bit of said motion-vector data.

9. The image processing apparatus according to claim 2 wherein one of said motion-vector prediction section and said deblocking processing section replaces the motion vector of said current MB with the motion vector of said comparison MB in accordance with said hybrid prediction information embedded in said motion-vector data if the absolute value of a difference in motion vector between said current and comparison MBs is greater than a threshold value.

10. The image processing apparatus according to claim 2 wherein said hybrid prediction information is embedded into a bit string representing said motion-vector data so as to occupy the position of a bit not required in processing making use of said motion-vector data.

11. The image processing apparatus according to claim 10 wherein said motion-vector data is data having a fixed-point format.

12. The image processing apparatus according to claim 11 wherein said fixed-point format includes a sign bit part, an integer part and a fraction part, and said hybrid prediction information is embedded into said motion-vector data to occupy the position of the least significant bit of said motion-vector data.

13. The image processing apparatus according to claim 2 wherein
said motion-vector data is created for each of the vertical and horizontal directions of coordinates of a position on a referenced image, and
said hybrid prediction information is embedded into a bit string representing said motion-vector data so as to occupy said position of a bit not required in processing making use of said motion-vector data.

14. The image processing apparatus according to claim 13 wherein said motion-vector data is data having a fixed-point format.

15. The image processing apparatus according to claim 14 wherein said fixed-point format includes a sign bit part, an integer part and a fraction part, and said hybrid prediction information is embedded into said motion-vector data to occupy the position of the least significant bit of said motion-vector data.

16. An image processing method comprising the steps of:
carrying out an inverse quantization process on compressed image information obtained as a result of a quantization process performed after an orthogonal transform process executed in block units;
carrying out an inverse orthogonal transform process on coefficient data obtained as a result of said inverse quantization process in order to output decoded image data;
carrying out a variable-length decoding process on received coded data in order to decode a motion vector expressed by said coded data;
carrying out a hybrid motion-vector prediction process on the basis of a result of said decoding step and generating motion-vector data obtained as a result of said hybrid motion-vector prediction process;
predicting a motion-vector by embedding hybrid prediction information to be used to indicate whether or not it is necessary to carry out a deblocking process into said motion-vector data so as to allow the result of said hybrid motion-vector prediction process to be reutilized at a deblocking processing step;
storing said motion-vector data into a memory in a state of being accessible at said deblocking process step;
carrying out a motion compensation process for said decoded image data output at said inverse orthogonal transform step by making use of said motion-vector data; and
carrying out said deblocking process on said decoded image data completing said motion compensation process in accordance with said hybrid prediction information embedded in said motion-vector data,
wherein the necessity to carry out a deblocking process on each block boundary in a frame processed by a video decoder is determined in accordance with two methods (1) the motion vectors of two adjacent blocks sandwiching a block boundary are compared with each other and, and if the result of the comparison indicates that the motion vectors of the two adjacent blocks are different from each other, a deblocking process is carried out on the block boundary; and (2) if the data of the block bordering upon a block boundary is composed of not only data of a referenced image including the block, but also data added from a bit stream, a deblocking process is carried out on the block boundary.

17. A non-transitory computer readable medium for storing an image processing program to be executed by a computer to carry out image processing, the program comprising the steps of:
carrying out an inverse quantization process on compressed image information obtained as a result of a quantization process performed after an orthogonal transform process executed in block units;
carrying out an inverse orthogonal transform process on coefficient data obtained as a result of said inverse quantization process in order to output decoded image data;
carrying out a variable-length decoding process on received coded data in order to decode a motion vector expressed by said coded data;
carrying out a hybrid motion-vector prediction process on the basis of a result of said decoding step and generating motion-vector data obtained as a result of said hybrid motion-vector prediction process;
predicting a motion-vector by embedding hybrid prediction information to be used to indicate whether or not it is necessary to carry out a deblocking process into said motion-vector data so as to allow the result of said hybrid motion-vector prediction process to be reutilized at said deblocking processing step;
storing said motion-vector data into a memory in a state of being accessible at said deblocking process step;
carrying out a motion compensation process for said decoded image data output at said inverse orthogonal transform step by making use of said motion-vector data; and
carrying out said deblocking process on said decoded image data completing said motion compensation process in accordance with said hybrid prediction information embedded in said motion-vector data,
wherein the necessity to carry out a deblocking process on each block boundary in a frame processed by a video decoder is determined in accordance with two methods (1) the motion vectors of two adjacent blocks sandwiching a block boundary are compared with each other and, and if the result of the comparison indicates that the motion vectors of the two adjacent blocks are different from each other, a deblocking process is carried out on the block boundary; and (2) if the data of the block bordering upon a block boundary is composed of not only data of a referenced image including the block, but also data added from a bit stream, a deblocking process is carried out on the block boundary.

* * * * *